3,124,509
PROCESS FOR THE PURIFICATION OF ACTH

Richard H. Johnson, Kalamazoo Township, Kalamazoo County, Mich., assignor to The Upjohn Company, Kalamazoo, Mich., a corporation of Michigan
No Drawing. Filed Oct. 18, 1952, Ser. No. 315,601
6 Claims. (Cl. 167—74)

The present invention relates to a process for the preparation of novel compositions of matter, and is more particularly concerned with the preparation of new organic compounds, i.e., adrenocorticotropic hormone (corticotropin) pectic compounds, more briefly specified hereinafter as ACTH pectic compounds, such as ACTH pectate and ACTH pectinate, and with an improved process for the purification of ACTH which involves the use of such ACTH pectic compounds. The adrenocorticotropic hormone, ACTH, produced by the anterior lobe of the pituitary gland, is important in stimulating production of hormones such as corticosterone, 17-hydroxy-11-dehydrocorticosterone (cortisone), 17-hydroxycorticosterone (compound F), and the like, by the adrenal cortex. The thus-produced adrenal cortex hormones have exhibited considerable physiological activity and are therapeutically necessary for the mainttnance of bodily health. The adrenocorticotropic hormone has also proved to be useful in the remission of rheumatic diseases such as rheumatoid arthritis and rheumatic fever by stimulating the adrenal cortex, causing the secretion of physiologically active steroids.

A purified ACTH, produced by the process of the present invention, is obviously desirable since a purer ACTH, having a greater degree of ACTH activity per milligram, is more stable in the biological system, more economical, and exhibits less side effects due to harmful contaminants.

It is therefore an object of the present invention to prepare new and useful ACTH pectic compounds. An additional object of the present invention is the preparation of ACTH pectates and ACTH pectinates. A further object of the present invention is to provide a novel process for the preparation of ACTH pectic compounds. An additional object is to provide a novel process for the purification of ACTH to a greater degree of ACTH activity per milligram of solids. Another object of the present invention is to purify ACTH to a greater degree of ACTH activity per milligram of solids by utilizing the novel ACTH pectic compounds of the present invention. Other objects of the present invention will be apparent to one skilled in the art to which the invention pertains.

According to the process of the present invention the ACTH pectic compounds are prepared by reacting ACTH with a pectic compound, precipitating the ACTH pectic compound, and recovering the ACTH pectic compound from the reaction mixture. The physiological potency of ACTH utilized herein is based on a provisional U.S.P. corticotropin reference standard which is the basis for the U.S.P. units; each milligram of provisional standard is equivalent to 0.005 U.S.P. or International units. One International unit of ACTH is defined as the biological activity contained in one milligram of the International Standard of ACTH which is held by the World Health Organization, and one U.S.P. unit of ACTH is equal to one International Unit.

The pectic compounds utilized herein include the polygalacturonic acids such as pectic acids, more specifically defined as completely demethylated pectins, and salts thereof. Representative salts which can be employed include calcium pectate, zinc pectate, aluminum pectate, and the alkali-metal pectates, for example, sodium pectate, potassium pectate, or the like. In addition pectinic acids having a methyl ester content of up to about ten percent, preferably about seven percent, and salts thereof, can also be employed. A greater methyl ester content is usually not desirable since this results in a corresponding reduction in the number of carboxyl radicals of the pectic acid molecule which are necessary for the reaction with ACTH.

In the process of the present invention, the pectic substance, dissolved in water or suspended in an alcohol such as ethanol, methanol, isopropanol, or the like, is mixed with a water solution of ACTH, such as the acid acetone powder, usually having a pH of 2 or less, prepared according to Li et al., [J. Biol. Chem., 149, 413, (1943)]. The pH of the resulting mixture is adjusted to between about 2.5 and about 5.0, preferably between about 2.5 and about 3.5. The reaction can be conducted between about zero and fifty degrees centigrade, preferably at about twenty five degrees centigrade. Reagents which can be utilized to adjust the pH include hydrochloric, acetic, trichloroacetic and sulfuric acids, sodium hydroxide, ammonium hydroxide, or the like. In some instances the pH of the resulting mixture will be satisfactory for the precipitation of the ACTH pectic compound without the addition of the above noted reagents, since the pH of the starting reactants can vary over such a wide range. The pH of the starting reactants can also be adjusted initially, prior to the reaction, so that the pH of the resulting mixture falls between about 2.5 and about 5, and pH adjustment of the mixture thus becomes unnecessary. The mixture, having the desired pH, is preferably cooled to about five degrees centigrade, although other temperatures between about zero and about fifty degrees centigrade can also be employed, usually for a period between about thirty minutes and about three hours. The cooled mixture may then be centrifuged, the resulting precipitate washed with an acid of pH 2.5 to 7 and the precipitate dried by washing with any well known water miscible low boiling solvent such as acetone, for example.

The assay of ACTH potency of the starting ACTH, of the novel ACTH pectic compounds and the purified ACTH produced by the present invention has been determined by the widely employed ascorbic acid depletion assay [Sayers et al., Endocrinology, 42, 379 (1948)]. The ascorbic acid content is approximately the same in the two adrenals of the test rats employed, and the assay is based upon the depletion of ascorbic acid in the adrenal of hypophysectomized rats following the administration of corticotropin. The test is carried out approximately twenty-four hours after hypophysectomy in male rats weighing 120–160 grams at the time of hypophysectomy. The rats are divided into four to six groups of five to ten rats each and two or three doses of standard and test preparation are used, thus allowing a standardization of the test preparation against the provisional U.S.P. corticotropin reference standard. The left adrenal gland is first removed under barbiturate anesthesia in order to determine the amount of ascorbic acid present before injection of the test preparation. The test solution is then injected intravenously into a tail vein immediately after the removal of the left adrenal. One hour later the right adrenal is removed. The response to the injection is expressed as the difference between the concentrations of ascorbic acid in the left and right adrenal, and the concentration is expressed as milligrams of ascorbic acid per 100 grams of adrenal tissue.

The procedure for the purification of ACTH involves the elution of a column of an ACTH pectic compound with a strong acid, preferably an acid solution having a pH of about 1.5 or less, for example, sulfuric, perchloric, nitric, or hydrochloric acid, which results in a release of refined acid-soluble ACTH from the ACTH pectic compound. The acid-insoluble pectic compound remains in the column and, of course, can be readily reused. The refined ACTH can be isolated from the acid mixture by any suitable method. Representative isolation procedure includes mixing the acid mixture with a precipitating agent such as acetone, methylethyl ketone, ethanol, or propanol, to precipitate the desired refined ACTH, and recovering the refined ACTH precipitate by filtration. The acid mixture can also be dialyzed, whereupon the non-dialyzable portion is lyophilized to produce refined ACTH. The purification process can also be accomplished in a batchwise operation, for example, by mixing the acid with an ACTH pectic compound and centrifuging or filtering the mixture to obtain the acid-soluble purified ACTH, whereupon refined ACTH is recovered from the acid mixture as outlined above.

The following examples will serve to illustrate the process and products of this invention, but the said invention is not to be considered as limited thereto.

Example 1

To 200 milligrams of sodium pectate suspended in two milliliters of ethanol was added eighteen milliliters of a water solution of ACTH, equivalent to 480 milligrams of ACTH having a potency of 1.5 units per milligram, and the resulting mixture having a pH of 4.5 was acidified with 0.2 N hydrochloric acid to a pH of about 3.3 The mixture was refrigerated, centrifuged, and the precipitate was washed with five milliliters of pH 3.5 hydrochloric acid, and dried with acetone. The dried precipitate weighed 316 milligrams and showed an ACTH potency of 1.6 units per milligram by the adrenal ascorbic acid depletion test. The total recovery of ACTH activity in the ACTH pectate precipitate was 506 units or 70 percent. The 23 milliliters of supernatant assayed 7.65 units per milliliter, a total of 176 units of ACTH or 24 percent of the starting potency.

Example 2

To 100 milligrams of sodium pectate suspended in one milliliter of ethanol was added nine milliliters of a water solution of ACTH, equivalent to 240 milligrams of ACTH, having a potency of 1.5 units per milligram, and the resulting mixture, having a pH of 4.7, was acidified with 0.2 N hydrochloric acid to a pH of 3.4. The mixture was refrigerated, centrifuged, the precipitate washed with two milliliters of pH 3.2 hydrochloric acid, and dried with acetone. The resulting precipitate weighed 138 milligrams and showed an ACTH potency of 1.9 units per milligram, a total of 264 units, by the adrenal ascorbic acid depletion test. The 13.5 milliliters of supernatant assayed 4.65 units per milliliter for a total of 64 units.

Example 3

To 50 milligrams of pectic acid suspended in 0.5 milliliter of double-distilled water was added five milliliters of a water solution of ACTH having a potency of 1.5 units per milligram, for a total of 160 units of ACTH. The mixture was acidified with 0.2 N hydrochloric acid to pH 3.5, centrifuged, and the ACTH pectate precipitate dried with acetone. The precipitate weighed seventy milligrams and assayed 2.07 units per milligram for a total of 147 units of ACTH.

Example 4

To 33 milligrams of calcium pectate suspended in 0.5 milliliter of absolute ethanol was added three milliliters of a water solution of ACTH, having a potency of 1.5 units per milligram or a total of 96 units, and the resulting mixture was acidified with 0.2 N hydrochloric acid to pH 3.1. The mixture was cooled for one hour at five degrees centigrade, centrifuged, and the precipitate dried with acetone. The precipitate, ACTH pectate, weighed 46 milligrams and showed an ACTH potency of 0.55 unit per milligram, a total of 25 units by the adrenal ascorbic acid depletion test.

Example 5

To ten milligrams of sodium pectate dissolved in two milliliters of water was added twenty milligrams of ACTH, having an ACTH potency of six units per milligram, the resulting mixture acidified with three drops of 0.2 N hydrochloric acid to lower the mixture pH to approximately 3.2. The mixture was cooled at five degrees centigrade for one hour, centrifuged, and the precipitate dried with acetone. The ACTH pectate precipitate weighed nineteen milligrams and assayed 5.72 units per milligram of ACTH by the ascorbic acid depletion test.

Example 6

To ten milligrams of sodium pectate suspended in two milliliters of water was added ten milligrams of ACTH, having an ACTH potency of eighteen units per milligram, and the mixture acidified with 0.2 N hydrochloric acid to lower the mixture pH to approximately three. The mixture was cooled for thirty minutes, centrifuged, and dried with acetone. The ACTH was recovered as the ACTH pectate precipitate and assayed 15 units per milligram.

Example 7

To fifteen milligrams of potassium pectinate having a six percent methyl ester content, suspended in three milliliters of water, was added twenty five milligrams of ACTH, having an ACTH potency of ten units per milligram, and the resulting mixture acidified to pH 3.1 with 0.2 N hydrochloric acid. The mixture was cooled at five degrees centigrade for one hour, centrifuged, and dried with acetone. The ACTH pectinate precipitate weighed fifteen milligrams and assayed eight units per milligram, a total of 120 units.

Example 8

A one gram sample of acid-acetone powder, containing 240 units of ACTH, was dissolved in 25 milliliters of double-distilled water, centrifuged, the residue washed with ten milliliters of double-distilled water and to the combined water solution was added 100 milligrams of pectic acid suspended in two milliliters of absolute ethanol to yield a mixture having a pH of 2.4. The pH of the mixture was adjusted to 3.2 with a 0.2 molar solution of ammonia and stirred for five minutes. Upon cooling for three hours at five degrees centigrade, the mixture was centrifuged and the insoluble fraction washed twice with eight-milliliter portions of a 0.2 normal (pH 0.85) hydrochloric acid. The first wash was removed by centrifuging, the second by filtration, and to the combined washings was added sufficient acetone to make a 92 percent solution of acetone. The mixture was allowed to stand at minus eighteen degrees centigrade for eight hours, centrifuged, and the precipitate dried with acetone. The precipitate weighed 31 milligrams and had an ACTH potency of 3.4 units per milligram, a fourteen-fold purification.

Example 9

A water slurry of pectic acid (prewashed with a 0.1 molar solution of hydrochloric acid, double-distilled water and a 0.05 molar solution of acetic acid) was poured into a glass pipe making a column one centimeter in diameter and 2.5 centimeters high. A 500-milligram sample of ACTH, assaying 2.1 units per milligram, was dissolved in seven milliliters of double-distilled water, centrifuged, and the insoluble material resuspended in three milliliters of double-distilled water and again centrifuged. The supernatants were passed through the prepared pectic acid column, utilizing one pound nitrogen pressure per square inch to maintain the flow rate of the column, followed by the addition of water until eleven milliliters of eluate, containing 150 units of ACTH, fourteen percent of the starting bioactivity was collected. The column was eluated with a 0.1 molar solution of acetic acid, ten milliliters collected and found to contain less than seven percent of starting bioactivity. The column was thereupon eluated with a 0.1 molar solution (pH 1.1) of hydrochloric acid, nine milliliters collected and found to contain 945 units of ACTH, equivalent to 91 percent of the starting bioactivity. A solids determination of the hydrochloric acid eluate showed the presence of 119 milligrams, a potency of eight units per milligram, a four-fold purification.

*Example 10*

A ten gram sample of acid-acetone powder, assaying 2400 units of ACTH, was dissolved in 250 milliliters of double-distilled water, two grams of Dicalite (diatomaceous earth) added thereto, the pH of the resulting mixture adjusted to 3.3 with a one molar solution of ammonia, and the mixture filtered. Two grams of prewashed pectic acid was added to the filtrate, the mixture stirred for three hours, maintained at five degrees centigrade for eight hours, centrifuged, and the insoluble fraction washed twice with a 0.1 molar solution of acetic acid. The combined supernatants, 415 milliliters, contained 1619 units of ACTH, equivalent to 47 percent of recovered bioactivity. The insoluble fraction was transferred to a sintered glass funnel, washed with seventy milliliters of double-distilled water, the insoluble fraction stirred with ten milliliters of a 0.1 molar solution (pH 1.1) of hydrochloric acid, filtered under a mild vacumn, and washed three additional times with five-milliliter portions of a 0.1 molar solution (pH 1.1) of hydrochloric acid. To the acid washings, combined with the acid filtrate, was added 270 milliliters of acetone, the mixture kept at minus eighteen degrees for 24 hours and thereupon centrifuged. The precipitate, dried with acetone, weighed 232 milligrams and contained 53 percent of recovered bioactivity.

The combined supernatant, containing 1619 units of ACTH, obtained as above, was stirred for 24 hours with two grams of prewashed pectic acid, centrifuged, and the insoluble fraction washed with two fifty-milliliter portions of double-distilled water. The combined water fraction was found to contain 200 units of ACTH. The insoluble fraction was washed three times with five-milliliter portions of a 0.1 molar solution (pH 1.1) of hydrochloric acid, three hundred milliliters of acetone was added to the washings to precipitate the solids, and the mixture allowed to stand for twenty four hours at minus eighteen degrees. The mixture was then centrifuged and the precipitate dried with acetone. The precipitate weighed 239 milligrams and contained 1243 units of ACTH activity. The total recovery in the 0.1 molar solution (pH 1.1) of hydrochloric acid was 571 milligrams, containing more than ninety percent of the starting bioactivity, thus showing a twenty-fold increase in purity.

*Example 11*

A 100-gram sample of acid-acetone powder, containing 24,000 units of ACTH, was dissolved in 2500 milliliters of double-distilled water and the pH adjusted to 3.35 with concentrated ammonia. The resulting solution was filtered, the filtrate stirred for nineteen hours with forty grams of prewashed pectic acid, the resulting mixture centrifuged, and the insoluble fractions washed with a total of 1050 milliliters of double-distilled water. The supernatants were combined and found to contain 2622 units of ACTH, eleven percent of the starting bioactivity. The precipitate was washed again with 2100 milliliters of water and the insoluble fractions transferred to a sintered glass funnel, slurried and filtered using 125, 75, 75, 75, and 50-milliliter portions of a 0.1 molar solution (pH 1.1) of hydrochloric acid. To the resulting combined hydrochloric acid filtrates was added 7600 milliliters of acetone, the resulting mixture allowed to stand at minus eighteen degrees centigrade for eight hours, thereupon centrifuged, and the precipitate dried with acetone. The resulting precipitate weighed 5.2 grams and assayed at 4.4 units per milligram, for a recovery of more than ninety percent of bioactivity and an eighteen-fold increase in purity.

It is to be understood that this invention is not to be limited to the exact details of operation or exact compounds shown and described, as obvious modifications and equivalents will be apparent to one skilled in the art and the invention is therefore to be limited only by the scope of the appended claims.

I claim:

1. In a process for the purification of ACTH, the steps of mixing ACTH with a pectic compound selected from the group consisting of pectic acid, pectinic acid having a methyl ester content of up to about ten percent, and metal salts of said acids, precipitating the ACTH pectic compound at a pH between about 2.5 and about 5.0, separating the ACTH pectic compound from the mixture, acidifying the ACTH pectic compound with an acid solution having a pH of less than about 1.5, and separating purified ACTH from the mixture.

2. In a process for the purification of ACTH, the steps of mixing ACTH with a pectic compound having a methyl ester content between zero and about ten percent, precipitating the ACTH pectic compound at a pH between about 2.5 and about 5.0, separating the ACTH pectic compound from the mixture, acidifying the ACTH pectic compound with an acid solution having a pH of less than about 1.5, and separating purified ACTH from the mixture.

3. In a process for the purification of ACTH, the steps of mixing ACTH with pectic acid, precipitating ACTH pectate at a pH between about 2.5 and about 5.0, separating ACTH pectate from the mixture, acidifying the ACTH pectate with an acid solution having a pH of less than about 1.5, and separating purified ACTH from the mixture.

4. In a process for the purification of ACTH, the steps of mixing ACTH with an alkali-metal pectate, adjusting the pH of the resulting mixture to between about 2.5 and about 5.0, separating ACTH pectate from the mixture, acidifying the ACTH pectate with an acid solution having a pH of less than about 1.5, and separating purified ACTH from the mixture.

5. In a process for the purification of ACTH, the steps of mixing ACTH with pectic acid, adjusting the pH of the resulting mixture to between about 2.5 and about 5, separating ACTH pectate from the mixture, acidifying the ACTH pectate with an acid solution having a pH of less than about 1.5, and separating purified ACTH from the mixture.

6. In a process for the purification of ACTH, the steps of mixing ACTH with sodium pectate, precipitating ACTH pectate at a pH between about 2.5 and about 3.5, separating ACTH pectate from the mixture, acidifying the ACTH pectate with an acid solution having a pH of less than about 1.5, and separating purified ACTH from the mixture.

References Cited in the file of this patent

UNITED STATES PATENTS

| | | |
|---|---|---|
| 2,294,016 | Brahn | Aug. 25, 1942 |
| 2,481,804 | Whittingham | Sept. 13, 1949 |
| 2,555,364 | Owens et al. | June 5, 1951 |

OTHER REFERENCES

Lesh: Science, vol. 112, July 1950, pp. 43–45.

Science News Letter, page 210, Oct. 4, 1947.

Denel: Helv. Chim. Acta, vol. 53, 1950, pp. 2171 to 2178.

Astwood: J.A.C.S., vol. 73, June 1951, pp. 2969 and 2970.

Ralli: Adrenal Cortex, 1951, p. 30.

Pigman: Chemistry of the Carbohydrates, 1948, Academic Press, Inc., New York, N.Y., p. 610.

New and Nonofficial Remedies, 1951, Lippincott Co., Philadelphia, Pa., p. 217.